United States Patent [19]

Rayburn

[11] Patent Number: 4,741,876

[45] Date of Patent: May 3, 1988

[54] METHOD FOR MANUFACTURING THERMALLY STABILIZED PLASTIC FILM CAPACITOR

[75] Inventor: Charles C. Rayburn, Lynchburg, Va.

[73] Assignee: Illinois Tool Works Inc., Chicago, Ill.

[21] Appl. No.: 716,275

[22] Filed: Mar. 26, 1985

[51] Int. Cl.[4] .................... B29C 43/20; B29C 43/54
[52] U.S. Cl. .................................. 264/346; 264/104; 264/348
[58] Field of Search ............... 264/40.2, 104, 105, 264/235, 235.8, 236, 293, 294, 322, 345, 346, 241, 348

[56] References Cited

U.S. PATENT DOCUMENTS

| | | | |
|---|---|---|---|
| 3,342,654 | 9/1967 | Golonka et al. | 264/346 |
| 3,452,133 | 6/1969 | Bratton et al. | 264/346 |
| 3,479,426 | 11/1969 | De Smedt | 264/342 |
| 3,547,748 | 12/1970 | D'Onofrio et al. | 264/342 X |
| 3,594,457 | 7/1971 | Wright | 264/294 X |
| 3,632,726 | 1/1972 | Knox et al. | 264/346 X |
| 3,646,188 | 2/1972 | Campbell | 264/346 X |
| 4,226,826 | 10/1980 | Motegi et al. | 264/235.8 |
| 4,497,865 | 2/1985 | Minami et al. | 264/235.8 |

Primary Examiner—Jan H. Silbaugh
Assistant Examiner—Hubert C. Lorin
Attorney, Agent, or Firm—Thomas W. Buckman

[57] ABSTRACT

A method for processing a layered structure incorporating alternating plastic film and electrically conductive layers to enhance thermal and capacitive stability of the structure, which plastic film has molecular bonds oriented in a first axis and a second axis, the method comprising the steps of applying compressive force to the structure in a third axis, which third axis is substantially perpendicular to the first and second axes; and raising the structure from an ambient temperature to a processing temperature while maintaining the compressive force on the structure, the processing temperature being sufficiently high to randomize the molecular bonds; and maintaining the structure at the processing temperature and under the compressive force for a processing time sufficient to effect randomization of substantially all of the molecular bonds in the structure; and allowing the structure to substantially cool to ambient temperature before removing the compressive force from the structure.

5 Claims, 2 Drawing Sheets

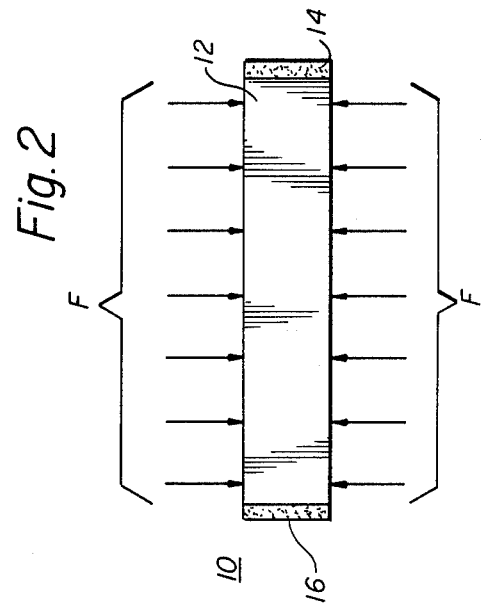
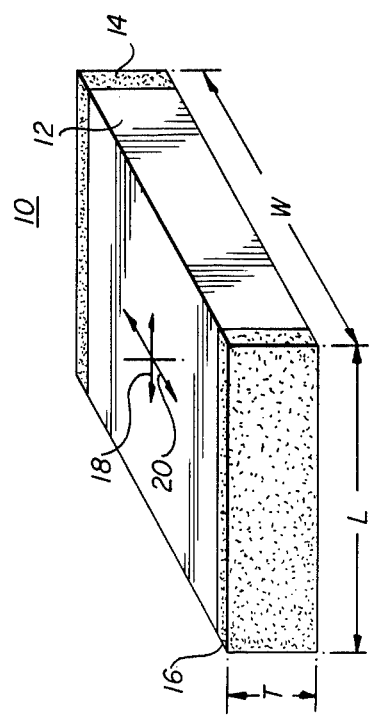

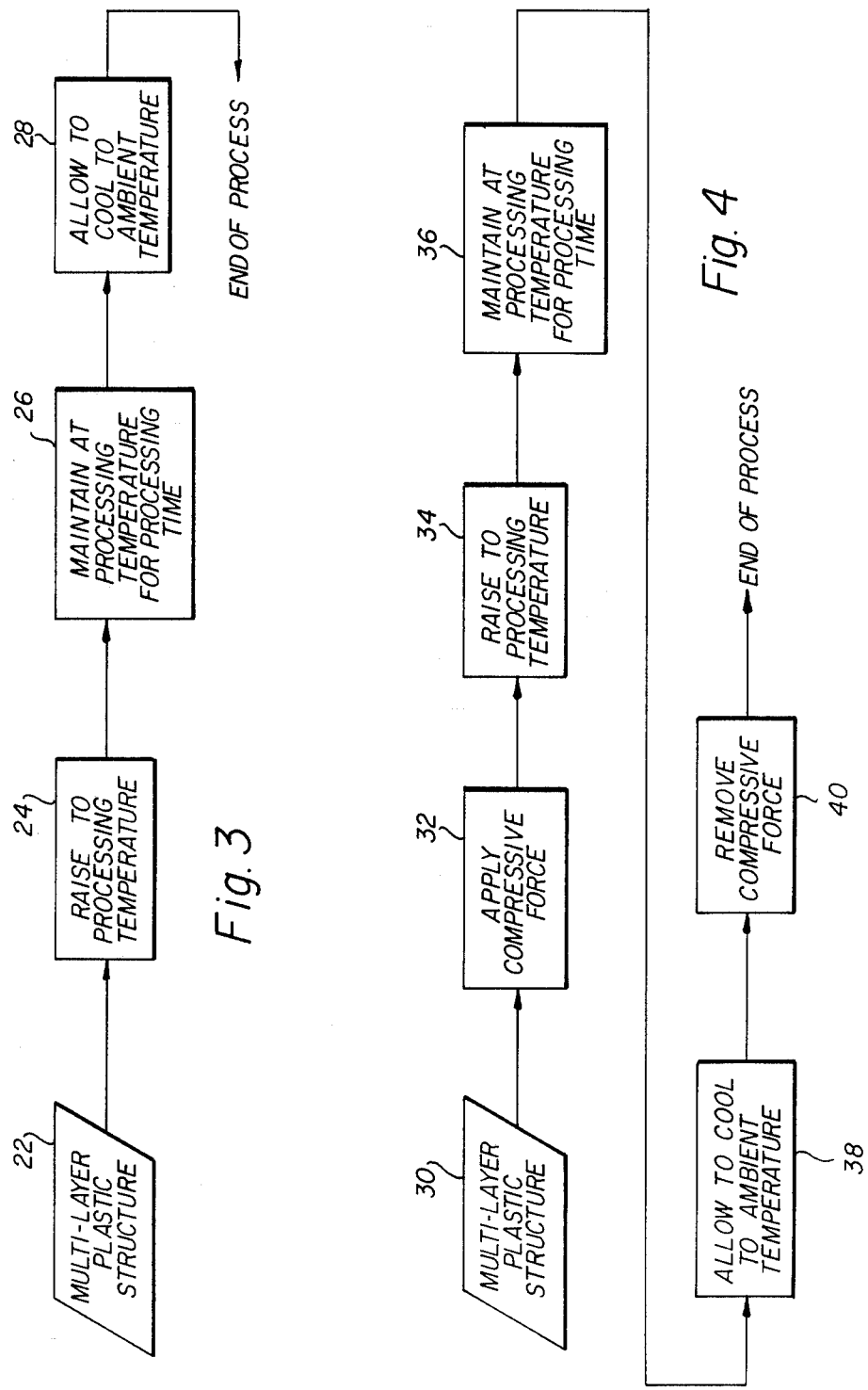

METHOD FOR MANUFACTURING THERMALLY STABILIZED PLASTIC FILM CAPACITOR

BACKGROUND OF THE INVENTION

As the technology of surface mounting electronic components to substrates continues to gain acceptance in today's marketplace and continues to find preference over through-hole circuit board assembly, ceramic multi-layer capacitors are increasing in popularity at the expense of polymer dielectric capacitors. Prior art polymer dielectric capacitors, in order to be suitable for surface mounted applications, must be thermally protected. However, such thermal protection renders the polymer dielectric capacitors larger in size and more expensive than similarly valued ceramic multi-layer capacitors. The ceramic multi-layer capacitor, if not thermally shocked, will withstand high temperature solder assembly techniques to substrates. In such high temperature solder assembly situations, a ceramic multi-layer capacitor's value will shift upward with the temperature rise during soldering and then exponentially decay over a period of days with the rate of decay depending upon the specific ceramic body involved. Ceramic capacitors, since they are subjected to extremely high temperatures during their manufacture, do not require an insulated overcoat to protect them thermally so that they are small and their cost is kept low.

It is well known in the electronics industry that polymer dielectric capacitors, commonly known as plastic film capacitors, enjoy some important advantages over ceramic multi-layer capacitors. For example, insulation resistance, a measure of the capacitor's resistance to providing a leakage path, is generally higher with plastic film capacitors than with similarly valued and dimensioned ceramic multi-layer capacitors.

Further, the dissipation factor, a factor relating to the dissipation of energy by a capacitor, is generally lower with plastic film capacitors than with similarly valued and dimensioned ceramic multi-layer capacitors.

Of perhaps the greatest importance is the capability of plastic film capacitors to self-heal in the event of a short circuit. Plastic film capacitors are coated with thin metal electrodes (generally aluminum) which electrodes vaporize at a shorted area to instantly clear the short and self-heal. Ceramic multi-layer electrodes are thick film and will not vaporize and clear. As a result, the ceramic multi-layer parts, when shorted, can dissipate a large amount of energy, which energy is sometimes manifested as heat sufficient to start fires within equipment.

Thus, it would be of extreme value to the electronic industry if a plastic film capacitor, with all of its advantages over ceramic multi-layer capacitors, could be produced which could withstand the rigors and the elevated temperatures of automated soldering techniques employed in surface mounting of electronic components in high volume production operations.

The present invention is directed to a method for manufacturing just such a plastic film capacitor, capable of being surface mounted upon a substrate using automated soldering techniques presently known in the industry, which soldering techniques involve temperatures significantly higher than it was previously thought possible to apply to plastic film capacitors.

SUMMARY OF THE INVENTION

The invention is a method for processing a capacitive structure of alternating layers of plastic film and electrically conductive material to enhance the capacitive stability of the capacitive structure at an elevated temperature such as is involved in automated surface mounting soldering operations. The invention contemplates, in its preferred embodiment, use of the method with a capacitive structure incorporating plastic film dielectric material having molecular bonds oriented in a first axis and a second axis, such as polyethylene terephthalate. A polyethylene terephthalate film is widely known in the electronics industry as MYLAR ® (MYLAR ® is registered trademark of the E. I. DuPont DeNemours Corp.)

The present invention involves raising a capacitive structure from an ambient temperature to a processing temperature, which processing temperature is sufficiently high to randomize the molecular bonds existing in the plastic film dielectric material. The capacitive device is then maintained at that processing temperature for a processing time sufficient to effect the randomization of substantially all of the molecular bonds in the plastic flim dielectric material and the capacitive structure is then allowed to cool substantially to the ambient temperature.

In the preferred embodiment of the present invention, a compressive force is applied in an axis substantially perpendicular to the two axes of the molecular bonds in the plastic film dielectric material prior to elevating the temperature of the capacitive structure from the ambient temperature to the processing temperature, and that compressive force is maintained throughout the process until the capacitive structure substantially cools to the ambient temperature.

It is therefore an object of the present invention to provide a method for processing a plastic film capacitor to enhance the thermal stability of that capacitor and rendor it capable of withstanding the rigors and elevated temperatures of techniques employed in connection with surface mounting of capacitors to substrates in production volume operations.

It is a further object of the present invention to provide a method for processing a plastic film capacitor to render that capacitor capacitively stable at elevated temperatures encountered in automated processing techniques used in surface mounting of capacitors to substrates in volume production operations.

Further objects and features of the present invention will be apparent from the following specification and claims when considered in connection with the accompanying drawings illustrating the preferred embodiment of the invention.

DETAILED DESCRIPTION OF THE DRAWINGS

FIG. 1 is a perspective schematic view of a capacitive structure of the type preferred to be processed by the method of the present invention.

FIG. 2 is a side view of the capacitive structure shown in FIG. 1, as viewed from the right side of FIG. 1.

FIG. 3 is a flow diagram of an alternative embodiment of the present invention.

FIG. 4 is a flow diagram of the preferred embodiment of the present invention.

DETAILED DESCRIPTION OF THE INVENTION

Referring to FIG. 1, a plastic film capacitor 10 is illustrated. The capacitor 10 includes a layered structure 12 which is made up of a plurality of alternating layers of plastic film and electrically conductive material (not shown). The capacitor 10 has electrical terminals 14 and 16 for providing electrical connection to the layered structure 12 in a manner appropriate to create a capacitive structure. The plastic film which is incorporated in the layered structure 12 is oriented in its molecular bonding in two axes 18 and 20.

Further illustrated by FIG. 1 are the dimensions of the capacitor 10: length L, width W, and thickness T.

Referring to FIG. 2, in which, for purposes of clarity of understanding the invention, like elements are indicated by like reference numerals, a side view of FIG. 1, as viewed from the right side of FIG. 1, is shown.

As the capacitor 10 is processed according to the present invention, the capacitor 10 is, preferably, subjected to a compressive force F and raised to a processing temperature which is sufficiently high to randomize the molecular bonds oriented in axes 18 and 20.

During the manufacture of the plastic film incorporated in capacitor 10, the film is bi-axially oriented with a length L and a width W in a manner whereby the film is simultaneously stretched such that the ratios of the change of length with respect to length ( L over L) and the change of width with respect to width ( W over W) are constant. A sheet of such processed film, when metallized, provides a dielectric film with dielectric constant K and according to an expression well known in the capacitor art, has a capacitance:

$$C = KLW/T$$

where L, W, and T are, respectively, the length, width and thickness of the sheet. The above expression also expresses the capacitance of the capacitance 10 as shown in FIG. 1, where L, W, and T are, respectively, the length, width, and thickness of the capacitor 10.

If an unrestrained sheet, or an unrestrained capacitor 10, is heated it will shrink. However, its initial volume must equal its final volume since L and W must shrink in proportion to their initial elongation and T correspondingly increases to maintain a constant volume. With such a decrease of L and W and a concurrent increase of T, clearly, by the above equation, the capacitance of capacitor 10 must decrease.

A first embodiment of the present invention contemplate just such a process. A preparatory step for practice of the method of this invention is that the capacitor 10 be constructed to have a capacitance higher than the desired capacitance of the end product. Such an initial (higher) capacitance would be chosen to be a certain capacitive value above the desired end-product capacitance based upon empirical information gleaned from experimental practice of the method of the present invention. The purpose of the initial (higher) capacitance is to anticipate the very decrease in capacitance hereinbefore described which will occur as a consequence of heating the capacitor 10 and the consequent shrinking of L and W with its commensurate increase of T.

Referring now to FIG. 3, having chosen a multilayer plastic structure (block 22) of appropriate initial (higher) capacitance, the capacitor 10 is then raised to a processing temperature (block 24), which processing temperature is sufficiently high to randomize the molecular bonds oriented in axes 18 and 20 of FIG. 1. Of course, the processing temperature must remain below a level at which the capacitor 10 will be destroyed. It is known that MYLAR® plastic film melts at approximately 250° C. A convenient temperature for the processing temperature of this invention has been found to be 205° C.; however, this invention is not intended to be limited to that temperature as a processing temperature.

Once the capacitor 10 is raised to the processing temperature (block 24 of FIG. 3) it is maintained at that processing temperature for a sufficient time to effect randomization of substantially all of the molecular bonds in the layered structure 12 of the capacitor 10; this step of the method is indicated at block 26 of FIG. 3. It has been found that an appropriate processing time for effectuation of the step indicated at block 26 of FIG. 3 is generally two hours; however, of course, it is not intended that the sclope of the invention disclosed hereby be limited to that processing time.

Following the lapse of the processing time and, therefore, completion of the step represented at block 26 of FIG. 3, the capacitor 10 is allowed to cool (block 28 of FIG. 3) to its initial ambient temperature, and thus ends the process.

In the preferred embodiment of the method of the present invention, a restraining force F (see FIG. 2) is applied to the capacitor 10 during its heating to its processing temperature and throughout its processing time to prevent the thickness T from increasing as the film is heated. The restraining force F is applied in an axis substantially perpendicular to a plane defined by the axes 18 and 20 and is controlled at a level to prevent the plastic film from extruding at the processing temperature.

The effect of this restraint of thickness T during practice of the method of this invention is indeed startling. Since the thickness T cannot increase because of the compressive force F, neither length L nor width W of the capacitor 10 can decrease since the volume of the capacitor 10 must remain constant. Thus, referring to the hereinabove recited equation, the capacitance is not changed as the film is subjected to its processing temperature and the molecular bonds are randomized.

Thus, the film's "memory" of its original biaxial orientation is erased. Thereafter the film can be elevated to at least the processing temperature during its further handling and attachment to a substrate in an electronic circuit with negligible, if any shrinkage of length L or width W, even in the absence of restraint of thickness T during such further handling or attachment. The plastic film of the capacitor 10, subjected to processing by the method of the present invention, is stripped of its memory to shrink further at temperatures at least up to the processing temperature.

An important consequence of this preferred embodiment of the invention is that one need not construct the capacitor 10 at a higher capacitance than the desired end-product capacitance in anticipation of a capacitance drop during processing. By restraining the thickness T with the compressive force F, the capacitance is prevented from changing during processing by this preferred embodiment of the present invention.

Thus, referring to FIG. 4, a multi-layer plastic structure such as plastic film capacitor 10 of FIG. 1, having the capacitance desired in an end product is produced (block 30 of FIG. 4).

The capacitor 10 is then subjected to a compressive force F restraining its thickness T, as shown in FIG. 2, as represented by block 32 of FIG. 4.

With the compressive force F still applied, the capacitor 10 is then raised to a processing temperature (block 34 of FIG. 4), which processing temperature is sufficiently high to randomize the molecular bonds of the plastic film of capacitor 10 oriented in axes 18 and 20 of FIG. 1.

The capacitor 10 is maintained at the processing temperature for a processing time sufficient to effect randomization of substantially all of the molecular bonds of the plastic film within the capacitor 10 (block 36 of FIG. 4). The compressive force F is maintained to restrict the thickness T of the capacitor 10 thoughout the processing time represented at block 36 of FIG. 4.

A representative temperature for the processing temperature for this preferred embodiment of the present invention is 205° C. and a representative processing time for this preferred embodiment of the present invention is two hours; however, this disclosure is not intended in any way to be restricted to that processing temperature or that processing time.

Upon the lapse of the processing time, the capacitor 10 is allowed to cool to its initial ambient temperature (block 38 of FIG. 4), and after the capacitor 10 has cooled to its initial ambient temperature, the compressive force F is removed therefrom (block 40 of FIG. 4). The process is then completed.

The exemplary capacitive device used for illustration of application of the method of this invention has been a parallel plate block plastic film capacitor. Both of the embodiments of the method of the invention hereinabove described can be applied successfully to a concentrically wound type of capacitor to effect similar benefits of capacitive stabilization at elevated temperatures.

Some practical difference in methods of achieving the steps of the method, in each of its embodiments, would be necessary to apply the method to such wound capacitors, but the method itself would remain unchanged. For example, since a wound capacitor (even after flattening into an ovate cross-sectional shape, which is sometimes accomplished) there are rounded portions to which it would be difficult to uniformly apply the compressive force F in an axis substantially perpendicular to a plane defined by the molecular bond axes 18 and 20 everywhere about the wound capacitor. A practical solution, of course, is to compress the wound capacitor between rigid plates with a force F and then place the thus-compressed, now certainly ovate in cross-sectional shape, capacitor in a liquid under an isostatic pressure substantially equal to compressive force F and maintained at the processing temperature.

So long as the isostatic pressure is raised to the appropriate level, substantially equal to force F, prior to raising the temperature of the liquid to the processing temperature, the capacitor will be thermally stabilized as hereinbefore described with respect to parallel plate block plastic film capacitors. If the temperature of the liquid is raised before the prescribed isostatic pressure is achieved, the plastic film of the capacitor will shrink in length and width, and therefore increase in thickness and lose capacitance, before the pressure is applied.

Certainly the first embodiment of the present invention (as illustrated in FIG. 3) could be practiced even more simply on a wound capacitor since the practical considerations of how to apply the compressive force F everywhere substantially perpendicular to the planes defined by molecular bonding axes 18 and 20 are absent.

It is to be understood that, while the detailed drawings and specific examples given describe preferred embodiments of the invention, they are for the purpose of illustration only, that the method of the invention is not limited to the precise details and conditions disclosed and that various changes may be made therein without departing from the spirit of the invention which is defined by the following claims.

I claim:

1. A method for processing a layered structure incorporating alternating plastic film and electrically conductive layers to enhance thermal stability of said structure, said plastic film having molecular bonds oriented in a first axis and a second axis, said method comprising the steps of:

applying compressive force to said structure in a third axis, said third axis being substantially perpendicular to said first axis and said second axis; and raising said structure from an ambient temperature to an elevated temperature while maintaining said compressive force on said structure, said elevated temperature being sufficiently high to randomize said molecular bonds; and maintaining said structure at said elevated temperature and under said compressive force for a processing time sufficient to effect said randomization of substantially all of said molecular bonds in said structure; and said elevated temperature being below the melting point of the plastic film; and maintaining the thickness of the plastic film constant during compressive and processing temperature steps; and allowing said structure to substantially cool to said ambient temperature and then removing said compressive force from said structure.

2. A method for processing a capacitive structure to enhance capacitive stability of said capacitive structure at an elevated temperature, said capacitive structure incorporating alternating layers of plastic film dielectric material and electrically conductive material, said plastic film dielectric material having molecular bonds oriented in a first axis and a second axis, said method comprising the steps of:

applying a compressive force to said capacitive structure in a third axis, said third axis being substantially perpendicular to said first axis and said second axis; and raising said capacitive structure from an ambient temperature to a processing temperature while maintaining said compressive force on said capacitive structure, said processing temperature being sufficiently high to randomize said molecular bonds; and maintaining said capacitive structure at said processing temperature and under said compressive force for a processing time sufficient to effect said randomization of substantially all of said molecular bonds in said capacitive structure; and processing temperature being below the melting point of the plastic film; and maintaining the thickness of the plastic film constant during compressive and processing temperature steps; and allowing said capacitive structure to substantially cool to said ambient temperature and then removing said compressive force from said capacitive structure.

3. A method for processing a capacitive structure to enhance capacitive stability of said capacitive structure at an elevated temperature as recited in claim 2 wherein said processing temperature is less than or equal to said elevated temperature.

4. A method for processing a capacitive structure to enhance capacitive stability of said capacitive structure at an elevated temperature as recited in claim 2 wherein said processing temperature is equal to or greater than said elevated temperature.

5. A method for processing a capacitive structure to enhance capacitive stability of said capactive strucutre at an elevated temperature as recited in claim 2 wherein said plastic film dielectric material is polyethylene terephthalate film.

* * * * *